US009483864B2

(12) United States Patent
Nutter et al.

(10) Patent No.: US 9,483,864 B2
(45) Date of Patent: Nov. 1, 2016

(54) SYSTEM AND METHOD FOR PHOTOREALISTIC IMAGING USING AMBIENT OCCLUSION

(75) Inventors: Mark R. Nutter, Austin, TX (US); Joaquin Madruga, Round Rock, TX (US); Barry L. Minor, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1341 days.

(21) Appl. No.: 12/329,470

(22) Filed: Dec. 5, 2008

(65) Prior Publication Data
US 2010/0141652 A1 Jun. 10, 2010

(51) Int. Cl.
G06T 15/50 (2011.01)
G06T 15/06 (2011.01)

(52) U.S. Cl.
CPC .................... G06T 15/06 (2013.01)

(58) Field of Classification Search
None
See application file for complete search history.

(56) References Cited

U.S. PATENT DOCUMENTS

| 6,940,504 | B1 * | 9/2005 | Mech | G06T 15/50 345/419 |
| 7,348,975 | B2 * | 3/2008 | Reshetov et al. | 345/421 |
| 7,408,550 | B2 * | 8/2008 | Bunnell | 345/426 |
| 7,439,973 | B2 * | 10/2008 | Fossum et al. | 345/422 |
| 7,499,053 | B2 * | 3/2009 | Keller et al. | 345/426 |
| 7,567,248 | B1 * | 7/2009 | Mark | G06T 11/40 345/426 |
| 7,675,518 | B1 * | 3/2010 | Miller | G06T 15/06 345/426 |
| 8,013,857 | B2 * | 9/2011 | Hempel et al. | 345/426 |
| 8,139,060 | B2 * | 3/2012 | Brown et al. | 345/426 |
| 2004/0001062 | A1 * | 1/2004 | Pharr | G06T 15/55 345/426 |
| 2005/0280648 | A1 * | 12/2005 | Wang | G06T 15/04 345/420 |

(Continued)

FOREIGN PATENT DOCUMENTS

JP 2008262493 10/2008

OTHER PUBLICATIONS

Bunnell, Dynamic Ambient Occlusion and Indirect Lighting, 2005, NVIDIA Corporation, GPU Gems 2, pp. 223-233.*

(Continued)

*Primary Examiner* — Anh-Tuan V Nguyen
(74) *Attorney, Agent, or Firm* — James L. Baudino

(57) ABSTRACT

Scene model data, including a scene geometry model and a plurality of pixel data describing objects arranged in a scene, is received. A primary pixel color and a primary ray are generated based on a selected first pixel data. If the primary ray intersects an object in the scene, an intersection point is determined. A surface normal is determined based on the object intersected and the intersection point. The primary pixel color is modified based on a primary hit color, determined based on the intersection point. A plurality of ambient occlusion (AO) rays each having a direction, D, are generated based on the intersection point, P and the surface normal. Each AO ray direction is reversed and the AO ray origin is set to a point outside the scene. An AO ray that does not intersect an object before reaching the intersection point is included in ambient occlusion calculations. The primary pixel color is shaded based on the ambient occlusion and the primary hit color and an image is generated based on the primary pixel color for the pixel data.

15 Claims, 8 Drawing Sheets

(56) References Cited

U.S. PATENT DOCUMENTS

| | | | |
|---|---|---|---|
| 2006/0176302 A1* | 8/2006 | Hayes | G06T 15/06 345/426 |
| 2007/0013696 A1* | 1/2007 | Desgranges et al. | 345/426 |
| 2007/0064002 A1* | 3/2007 | Xue | G06T 15/08 345/426 |
| 2007/0182732 A1* | 8/2007 | Woop et al. | 345/420 |
| 2008/0074420 A1* | 3/2008 | Kuesel | G06T 15/06 345/426 |
| 2008/0100617 A1* | 5/2008 | Keller | G06T 15/50 345/421 |
| 2008/0114942 A1 | 5/2008 | Brown et al. | |
| 2008/0143721 A1 | 6/2008 | Liou et al. | |
| 2008/0150944 A1 | 6/2008 | Reshetov et al. | |
| 2008/0174600 A1* | 7/2008 | Xie | G06T 15/60 345/426 |
| 2008/0218517 A1* | 9/2008 | Holmdahl | 345/426 |
| 2008/0246770 A1* | 10/2008 | Kiefer et al. | 345/441 |
| 2009/0096788 A1* | 4/2009 | Salsbury | G06T 15/06 345/426 |
| 2009/0102844 A1 | 4/2009 | Deparis | |
| 2009/0128562 A1* | 5/2009 | McCombe | G06T 15/06 345/427 |
| 2009/0153557 A1* | 6/2009 | Dimitrov | G06T 15/506 345/426 |
| 2009/0309877 A1* | 12/2009 | Snyder et al. | 345/426 |

OTHER PUBLICATIONS

Perez, Real-Time Dynamic Ambient Occlusion, Sep. 5, 2005, National Centre for Computer Animation, Bournemouth University, pp. 1-21.*

Kurachi, Noriko; Thought of BRDF model shown in foreign movies; CG World; Japan; Works Corporation, Ltd.; Dec. 1, 2004; vol. 76; pp. 74-77.

Office Action corresponding to Japanese Application No. 2009-262804; Sep. 3, 2013.

Kurachi, Noriko; Lighting/Subsurface Scattering; CG World; Japan; Works Corporation, Ltd.; Aug. 1, 2005; vol. 84; pp. 86-97.

* cited by examiner

SYSTEM AND METHOD FOR PHOTOREALISTIC IMAGING USING AMBIENT OCCLUSION

TECHNICAL FIELD

The present invention relates generally to the field of computer graphics and photorealistic image generation and, more particularly, to a system and method for improved photorealistic imaging using ambient occlusion.

BACKGROUND OF THE INVENTION

Modern computer graphics systems and methods include a variety of techniques designed to render high-quality images for use in a wide variety of applications, including video games, flight and other simulation, motion pictures, and many other applications. For example, for animation studios, ray tracing and global illumination techniques now play an integral role in motion picture production and special effects.

One common approach is to use hierarchical groups or "packets" of rays, which can be tested against a hierarchical acceleration structure (HAS) in order to discard a subset of geometry from consideration, such as, for example, when that subset does not reach the observation point. While the conventional approaches are theoretically efficient, casting ambient occlusion rays often puts a tremendous strain on caches and local stores, and requires an unnecessary amount of work.

Therefore, there is a need for a system and/or method for photorealistic imaging that addresses at least some of the problems and disadvantages associated with conventional systems and methods.

BRIEF SUMMARY

The following summary is provided to facilitate an understanding of some of the innovative features unique to the embodiments disclosed and is not intended to be a full description. A full appreciation of the various aspects of the embodiments can be gained by taking into consideration the entire specification, claims, drawings, and abstract as a whole.

In one embodiment, scene model data, including a scene geometry model and a plurality of pixel data describing objects arranged in a scene, is received. A first pixel data of the plurality of pixel data is selected. A primary pixel color and a primary ray are generated based on the first pixel data. If the primary ray intersects an object in the scene, an intersection point, P is determined. A surface normal, N, is determined based on the object intersected and the intersection point, P. A primary hit color is determined based on the intersection point, P. The primary pixel color is modified based on the primary hit color. A plurality of ambient occlusion (AO) rays are generated based on the intersection point, P and the surface normal, N, with each AO ray having a direction, D. For each AO ray, the AO ray direction is reversed, D, the AO ray origin, O, is set to a point outside the scene. Each AO ray is marched from the AO ray origin into the scene to the intersection point, P. If an AO ray intersects an object before reaching point P, that AO ray is excluded from ambient occlusion calculations. If an AO ray does not intersect an object before reaching point P, that ray is included in ambient occlusion calculations. Ambient occlusion is estimated based on included AO rays. The primary pixel color is shaded based on the ambient occlusion and the primary hit color and an image is generated based on the primary pixel color for the pixel data.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

Figure 1:
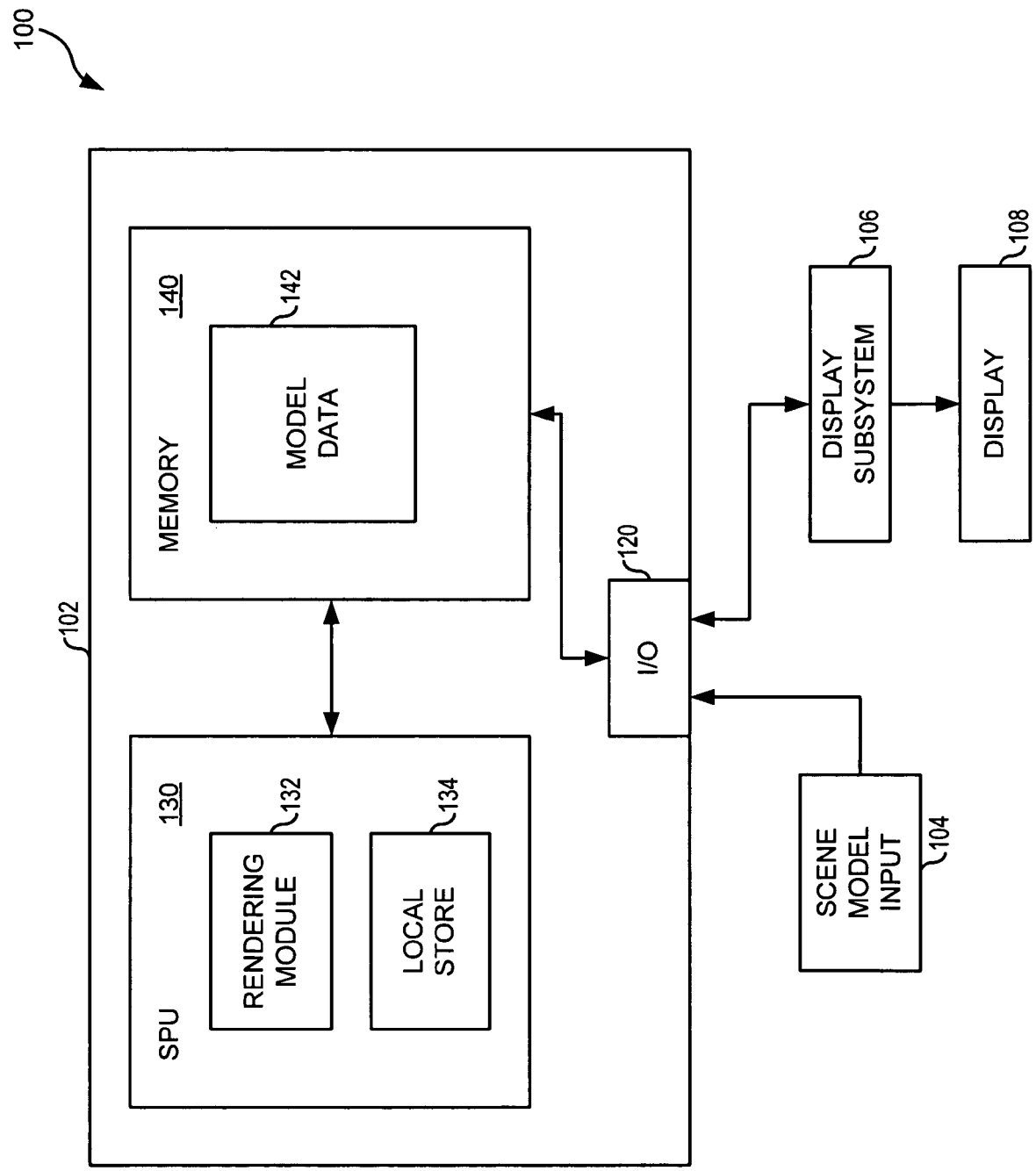
FIG. 1 illustrates a block diagram showing a computer graphics system in accordance with a preferred embodiment.

The particular values and configurations discussed in these non-limiting examples can be varied and are cited merely to illustrate at least one embodiment and are not intended to limit the scope of the invention.

In the following discussion, numerous specific details are set forth to provide a thorough understanding of the present invention. Those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electro-magnetic signaling techniques, user interface or input/output techniques, and the like, have been omitted inasmuch as such details are not considered necessary to obtain a complete understanding of the present invention, and are considered to be within the understanding of persons of ordinary skill in the relevant art.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

Referring now to the drawings, FIG. 1 is a high-level block diagram illustrating certain components of a system 100 for improved photorealistic imaging using ambient occlusion, in accordance with a preferred embodiment of the present invention. Generally, system 100 performs photorealistic imaging using ambient occlusion and comprises a graphics engine 102.

For example, many photorealist imaging techniques focus on tracing the path an imaginary ray of light travels as it moves from a light source though a scene. In "ray casting," for each pixel in a scene, a graphics system traces an imaginary ray from a selected observation point into the scene, to a selected light source, updating pixel color, shading and other factors, based on whether the ray intersects with an object in the scene on its way to the light source. In this way, the graphics system can quickly determine whether an object in a scene is visible to the observation point (visibility), and whether other objects in the scene block light coming from a light source from falling on the object (direct shadows). As such, the graphics system can render a three-dimensional scene into a two-dimensional image suitable for a computer screen, for example. As used herein, "ray casting" means tracing a ray for visibility and direct shadow computations.

In "ray tracing," particularly Whitted-style ray tracing, when a tracing ray intersects an object in a scene, the graphics system generates one or more of three additional types of rays, "secondary rays," whose origin is the intersection point of the tracing ray and the object: reflection rays, refraction rays and shadow rays. "Reflection" rays travel from the intersection point in the direction of the mirror reflection path of the original ray. If a reflected ray intersects with another object, that reflected object affects the pixel representing the intersection point, by showing a mirror image of the reflected object on the first object.

If the original tracing ray intersects a transparent object, "refraction" rays travel from the intersection point in the direction of the refraction path of the original ray, and can travel through the object. If a refraction ray intersects with another object, the graphics system updates the pixel representing the intersection point accordingly. If the object faces a light source, "shadow" rays trace a direct-line path from the intersection point to the light source. If a shadow ray intersects an opaque object, the opaque object blocks the light coming from the light source to the intersection point, and the graphics system updates the pixel representing the intersection point accordingly.

In addition to Whitted-style secondary rays, typical graphics systems can also perform a number of other scene manipulations to enhance the photorealism of the depicted scene. For example, "global illumination" (a general term for techniques that add indirect lighting considerations to a scene) adds additional realism to a scene by improving the realism of scene lighting. Because global illumination techniques are frequently resource-intensive, some typical graphics systems use ambient occlusion to simulate global illumination. Generally, conventional "ambient occlusion" casts multiple rays from primary and secondary intersection points, computing coverage ratios based on the number of sample rays that intersect with other objects and surfaces.

Ambient occlusion and ray tracing's secondary rays add detail not available in ray casting, which results in more photorealistic images. However, the additional rays also require additional computation and storage resources. Such additional computation and storage requirements have often made interactive ray tracing impractical or impossible. The novel embodiments described herein overcome some of these limitations.

As described in more detail below, system 100 can be configured to use hierarchical groups or "packets" of rays, which can be tested against a hierarchical acceleration structure (HAS) in order to discard a subset of geometry from consideration, such as, for example, when that subset does not reach the observation point. Generally, a HAS is a data structure comprised of nodes arranged in an order, and used to hold information about scene geometry, which can be used to evaluate whether a particular ray path intersects an object in the scene, among other things. Example HASs include the uniform grid, binary tree, KD tree, octree, and bounded-volume hierarchy (BVH). Using hierarchical packets of rays and traversing the packets through an acceleration structure often greatly reduces the required number of operations while maintaining acceptable accuracy.

In practice, there are a variety of typical techniques useful in solving the ambient occlusion integral. One of the most straight forward approaches is to approximate the visibility function at an intersection point, P, by using the Monte Carlo or other sampling method to cast rays from P, and then test for intersection with other objects in the scene geometry. Ambient exposure at P is estimated by the number of ambient rays that did not intersect divided by the total number of rays cast.

Typical efficient implementations of HASs can intersect ambient occlusion rays with three-dimensional scenes by traversing the scene from front to back, from the intersection point to the scene boundary or object intersection, thus avoiding unnecessary traversal of parts of the Acceleration Structure that are occluded. For example, in one approach, every level in the hierarchy stores the dimension of maximum separation for the child nodes at that level. At run time, the graphics engine combines the maximum separation with the ray direction in order to select which child node to visit first.

While the conventional approaches are theoretically efficient, casting ambient occlusion rays from the intersection point, P often puts a tremendous strain on caches and local stores, and requires an unnecessary amount of work. Specifically, because the point P lies inside the scene and because of the nature of front to back traversal, it is possible and likely that the graphics engine will examine occluded portions of the HAS before the ambient occlusion rays can begin intersecting with scene geometry in front of P. Thus, as described in more detail below, system 100 provides a mechanism to traverse the HAS with reduced strain on caches and local stores.

Broadly, as described in more detail below, system 100 provides a graphics system that greatly improves the quality of photorealistic imaging, though improving the process by which the graphics engine determines a photorealistic ambient occlusion level for a particular scene. The disclosed embodiments improve ray tracing performance generally and ambient occlusion manipulations in particular. Further, the novel graphics engine and embodiments described herein can provide improved ray tracing performance, even in systems with limited local storage. Thus, the disclosed embodiments can improve performance on high-end systems and enable acceptable graphics performance in operations that would otherwise be outside the capability of the graphics hardware.

More specifically, graphics engine 102 receives and processes scene model input 104, generating a plurality of pixel color data and other information. Graphics engine 102 passes the generated information to a display subsystem 106, which uses the generated information to display an image on a display 108. Typical scene model input 104 includes a plurality of pixel data and a scene geometry model describing an arrangement of objects in a scene. A typical motion picture can include many thousands of still images, each of which is an arrangement of objects in a scene.

Generally, the plurality of "pixel data" correlates the objects in the scene with a reference frame, such as a display screen, placing a finite upper bound on the number of pixels describing the scene from the reference frame. Each pixel used in the scene model input has associated pixel data. In one embodiment, the pixel data includes a coordinate reference for the pixel, indicating the pixel's relative location to other pixels, and a preliminary pixel color, which graphics engine 102 modifies over the course of processing the pixel data, as described below. In an alternate embodiment, the pixel data does not include a preliminary color, and graphics engine 102 adds a pixel color to each of the plurality of pixel data, based on the processing described in detail below.

In the illustrated embodiment, graphics engine 102 includes an input/output (I/O) module 120. Generally, I/O module 120 is an otherwise conventional I/O interface. In operation, I/O module 120 receives scene model input 104. I/O module 120 also couples to a display subsystem 106. Display subsystem 106 is an otherwise conventional display subsystem and is configured to receive processed scene model data from graphics engine 102 and to display an image on display 108 based on the processed scene model data.

In the illustrated embodiment, graphics engine 102 includes a synergistic processing unit (SPU) 130 and memory 140. SPU 130 is an otherwise conventional processing unit (PU), modified as described below. In one embodiment, SPU 130 is a Cell™ processor. In an alternate embodiment, SPU 130 is a Broadband Engine™ processor. Memory 140 is an otherwise conventional memory module 140, modified as described below. Generally, in operation, graphics engine 102 receives unprocessed scene model data 104 and stores the unprocessed scene model data 104 in memory 140. SPU 130 processes the scene model data 104 to generate processed scene model data suitable for display subsystem 106 to use to display an image.

More specifically, memory 140 includes model data 142. Model data 142 refers to received scene model data, in various stages of processing. In one embodiment, model data 142 is arranged as a HAS. In one embodiment, model data 142 is arranged as a bounding volume hierarchy (BVH).

SPU 130 includes rendering module 132 and local store 134. Rendering module 132 is a logic block configured to process scene model data, described in more detail below. Local store 134 is an otherwise conventional PU local store, adapted as described below. Generally, SPU 130 retrieves portions of the model data 142 from memory 140, storing the retrieved portions in local store 134. In one embodiment, the retrieved portions are each of a single pixel data of the plurality of pixel data. As described in more detail below, rendering module 132 processes the retrieved portions of the scene model data, adding a pixel color or modifying an existing pixel color, and returns the modified pixel data to model data 142.

Figure 2:
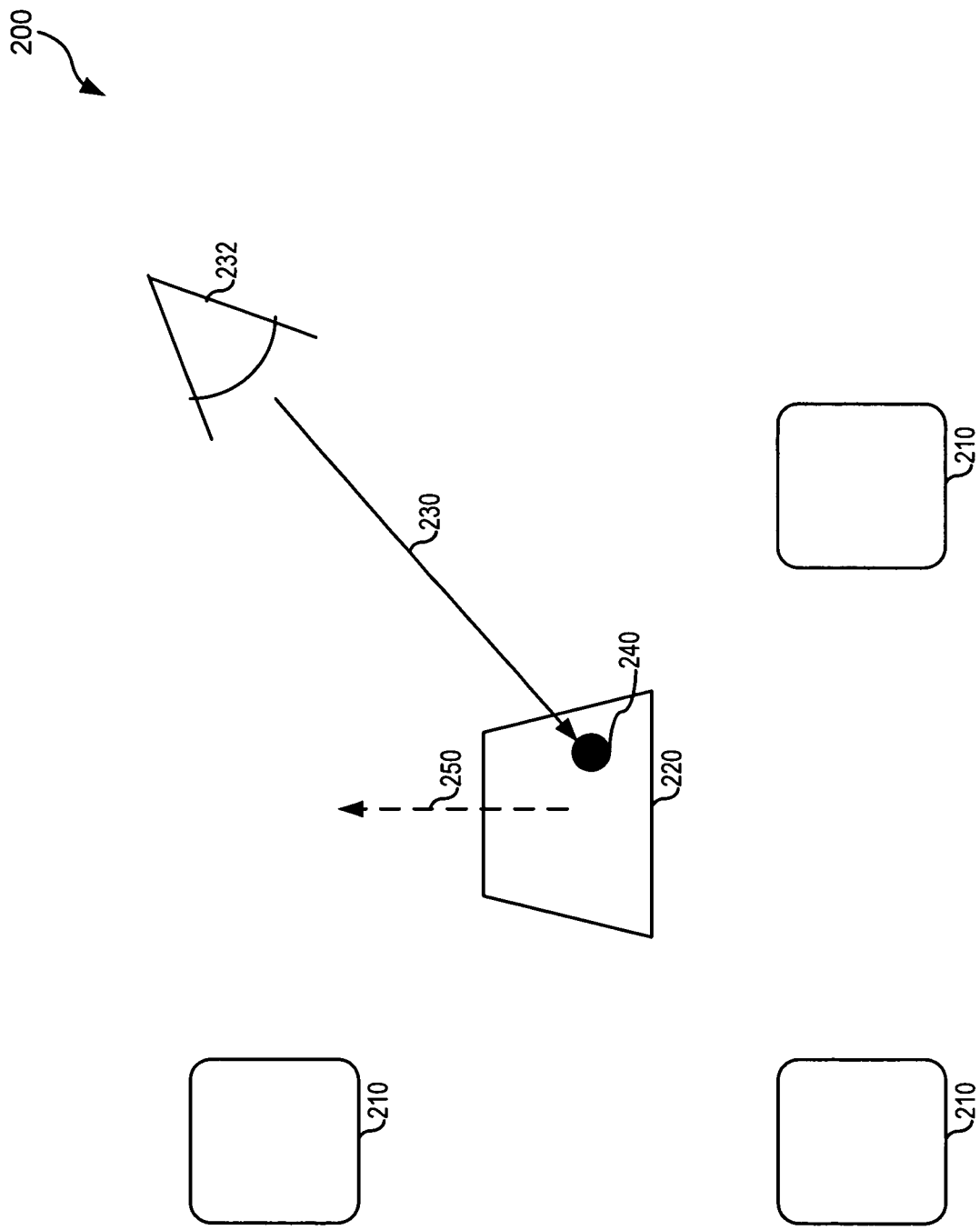
FIG. 2 illustrates a block diagram showing primary ray casting in an exemplary scene in accordance with a preferred embodiment.

More particularly, graphics engine 102 receives scene model data 104 and performs the novel ambient occlusion techniques described herein. FIG. 2 illustrates primary ray casting in an exemplary scene 200. Scene 200 includes a plurality of objects 210 and a surface 220. A primary ray 230, cast from observation point 232, intersects surface 220 at intersection point 240. Surface normal 250 indicates the direction of the vector normal to surface 220 (at point 240).

Figure 3:
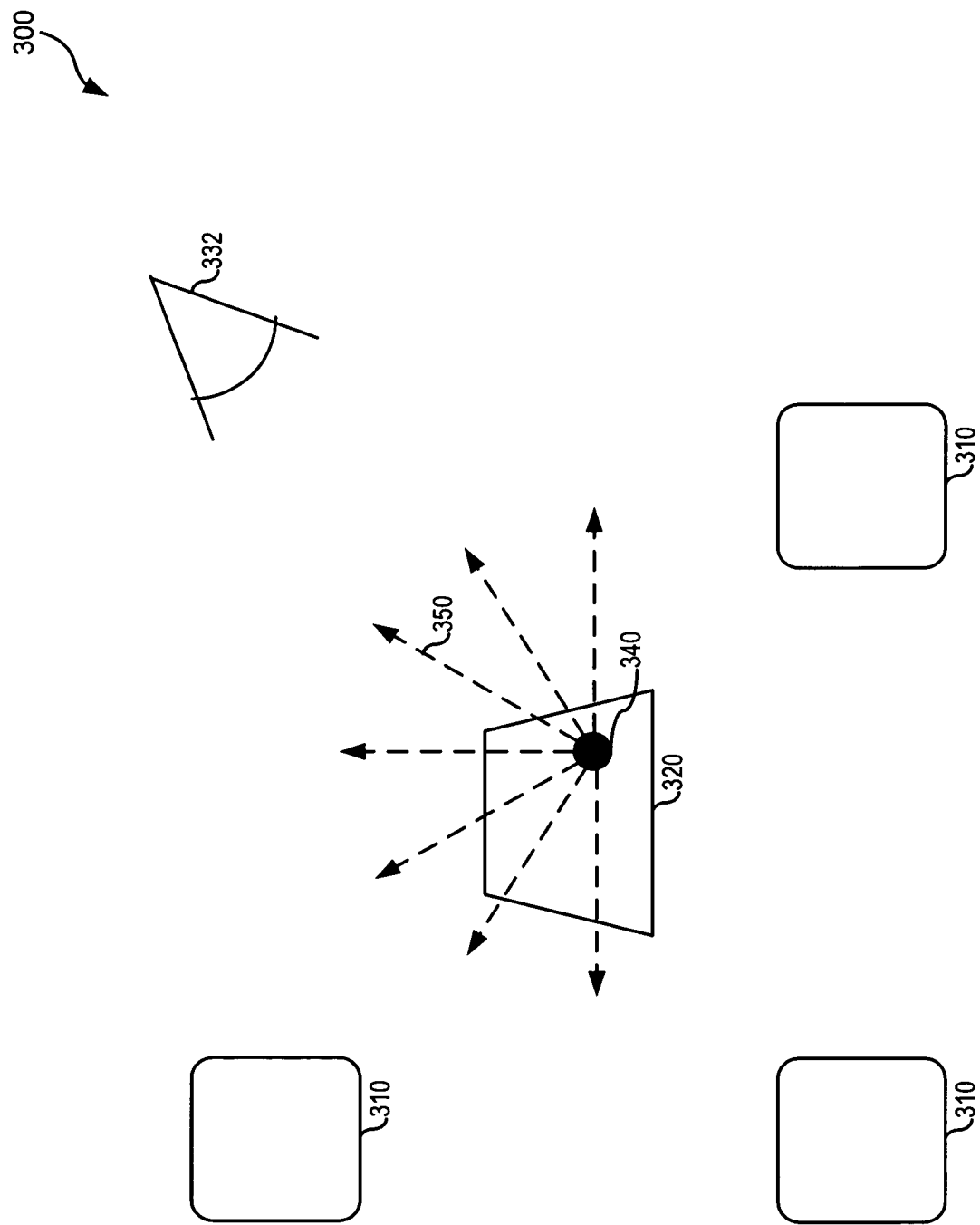
FIG. 3 illustrates a block diagram showing ambient occlusion rays in an exemplary scene in accordance with a preferred embodiment.

FIG. 3 illustrates ambient occlusion ray casting in an exemplary scene 300, with observation point 332. A plurality of ambient occlusion rays 350 travel away from intersection point 340 of surface 320. Some of the ambient occlusion rays 350 will intersect with an object 310.

Figure 4:
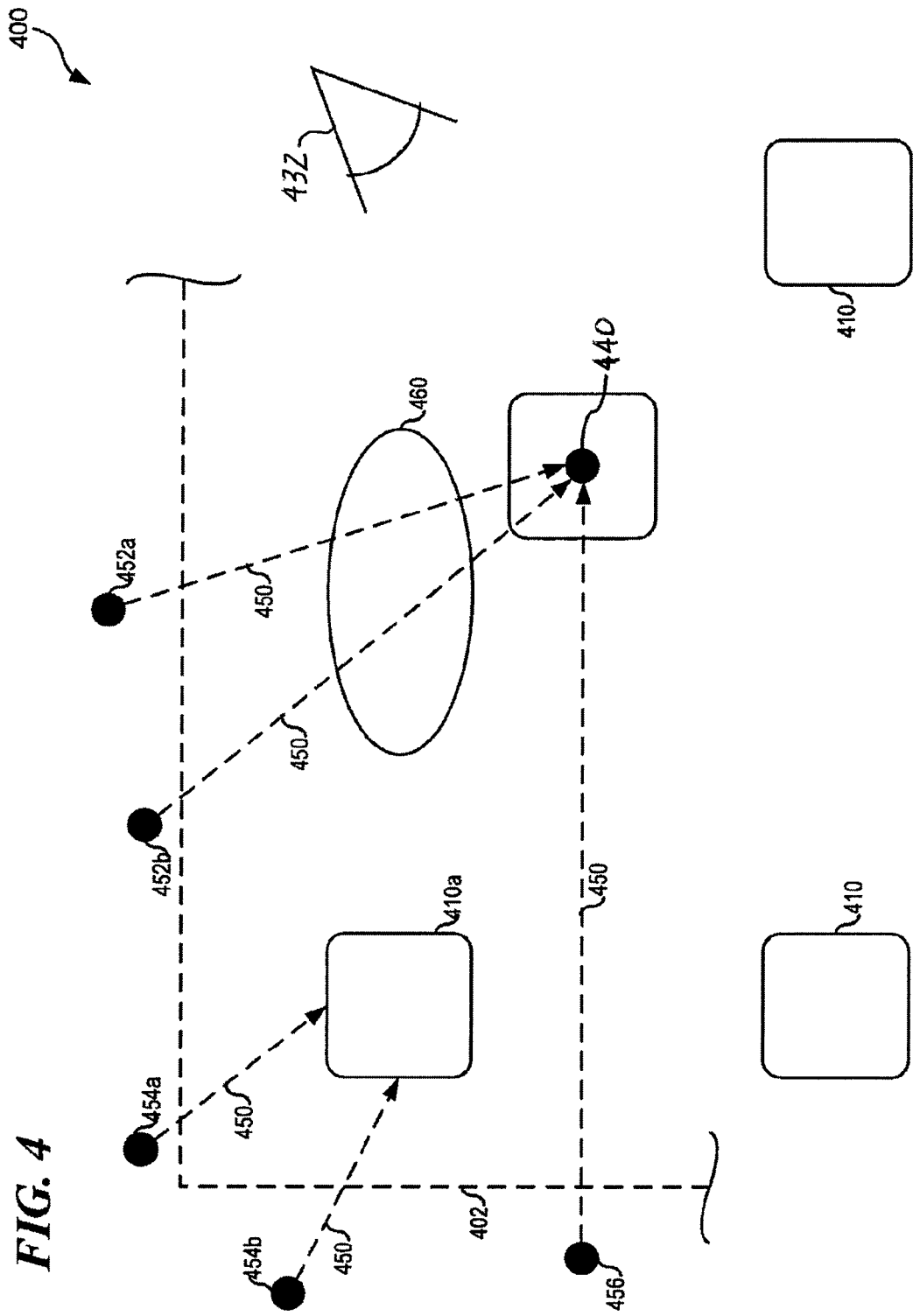
FIG. 4 illustrates a block diagram showing an example of an improved approach to ambient occlusion in accordance with a preferred embodiment.

FIG. 4 illustrates improved ambient occlusion ray processing in accordance with a preferred embodiment, in an exemplary scene 400, with observation point 432 and scene boundary 402. A plurality of ambient occlusion (AO) rays 450 travel from origin points outside the scene boundary 402. Generally, scene boundary 402 represents the limit of the scene model data known to the graphics engine.

Each AO ray 450 travels from its origin outside scene boundary 402 in a straight line toward intersection point 440 of surface 420. In some embodiments, the graphics engine groups AO rays 450 into packets 460. As shown, AO rays 450 with origin points 452a, 452b, and 456 do not intersect with objects in the scene on their way to the intersection point 440. Accordingly, these rays are included in subsequent ambient occlusion calculations.

As shown, AO rays 450 with origin points 454a and 454b intersect with object 410a on their way to intersection point 440. As such, surface 420 is partially occluded by object 410a and these rays are not included in subsequent ambient occlusion calculations.

In one embodiment, the graphics engine considers all AO rays in ambient occlusion calculations, dividing the number of "included" AO rays by the total number of both "included" and "excluded" AO rays, to generate a coverage ratio. In an alternate embodiment, the graphics engine considers only "included" AO rays in ambient occlusion and/or shading calculations.

Figure 5:
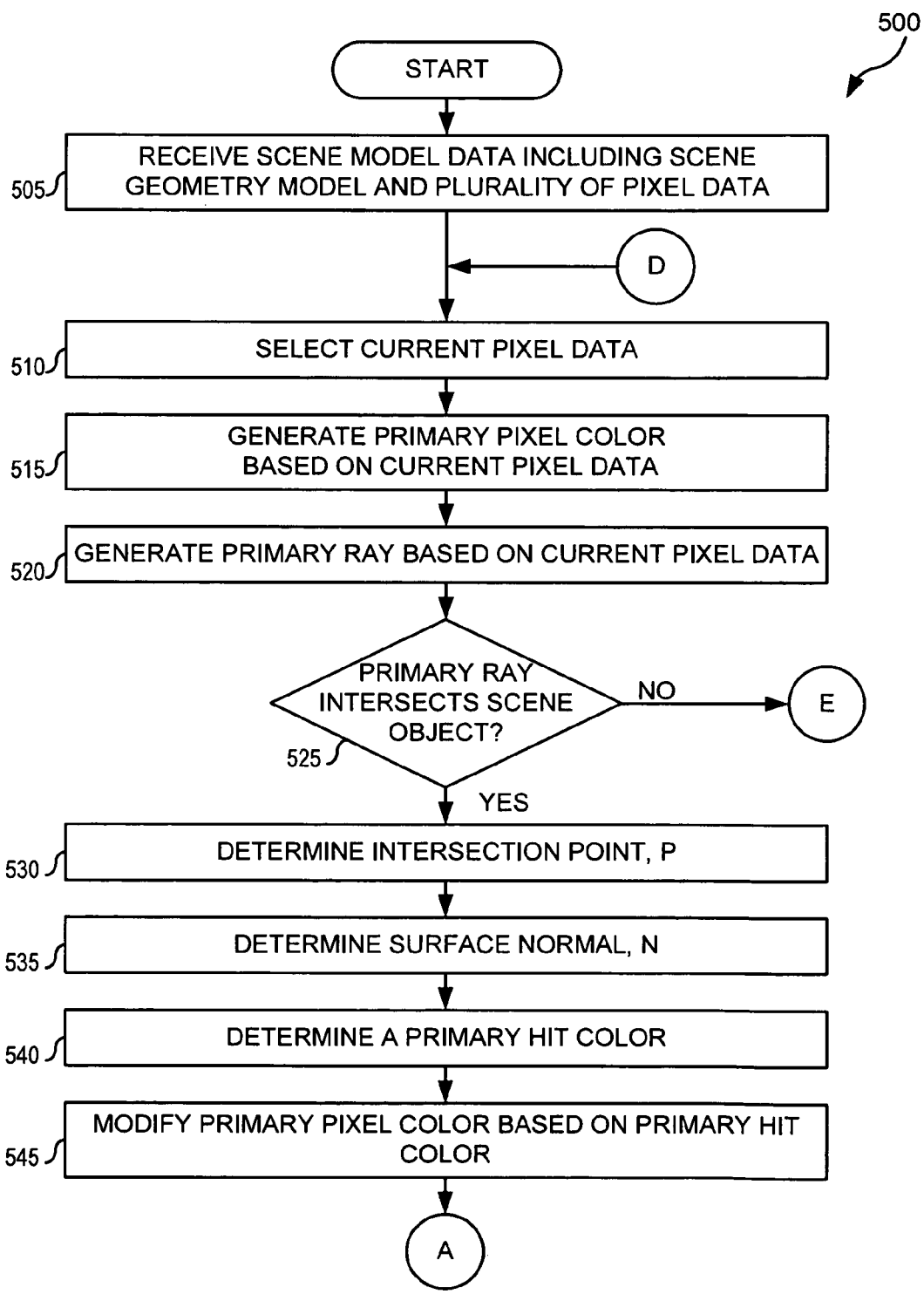
FIG. 5 illustrates a high-level flow diagram depicting logical operational steps of an improved ambient occlusion method, which can be implemented in accordance with a preferred embodiment.

FIG. 5 illustrates one embodiment of a method for photorealistic imaging using ambient occlusion. Specifically, FIG. 5 illustrates a high-level flow chart 500 that depicts logical operational steps performed by, for example, system 100 of FIG. 1, which may be implemented in accordance with a preferred embodiment. Generally, a graphics engine, such as graphics engine 102 of FIG. 1, performs the steps of the method, unless indicated otherwise.

As indicated at block 505, the process begins, wherein the graphics engine receives scene model data, which includes a scene geometry model and a plurality of pixel data. In one embodiment, one or more of the plurality of pixel data includes a preliminary pixel color. Next, as indicated at block 510, the graphics engine selects one of the plurality of pixel data as the current pixel data.

Next, as indicated at block 515, the graphics engine generates a primary pixel color based on the current pixel data. In one embodiment, the graphics engine generates the primary pixel color based on the preliminary pixel color. Next, as indicated at block 520, the graphics engine generates a primary ray based on the current pixel data. For clarity of explanation, in the illustrated embodiment, the graphics engine generates one primary ray per pixel. In an alternate embodiment, the graphics engine generates a plurality of primary rays per pixel, following one or more of the steps described below for each primary ray.

Next, as indicated at decisional block 525, the graphics engine determines whether the primary ray intersects an object in the scene based on the scene geometry model. If at block 525 the primary ray intersects an object in the scene, the process continues along the YES branch to block 530.

Next, as indicated at block 530, the graphics engine determines an intersection point, P, based on the intersection of the primary ray and the object. Next, as indicated at block 535, the graphics engine determines a surface normal, N, based on the intersection of the primary ray and the object.

Next, as indicated at block 540, the graphics engine determines a primary hit color based on the intersection of the primary ray and the object. Next, as indicated at block 545, the graphics engine modifies the primary pixel color based on the primary hit color. The process continues to marker "A" of FIG. 6.

Figure 6:
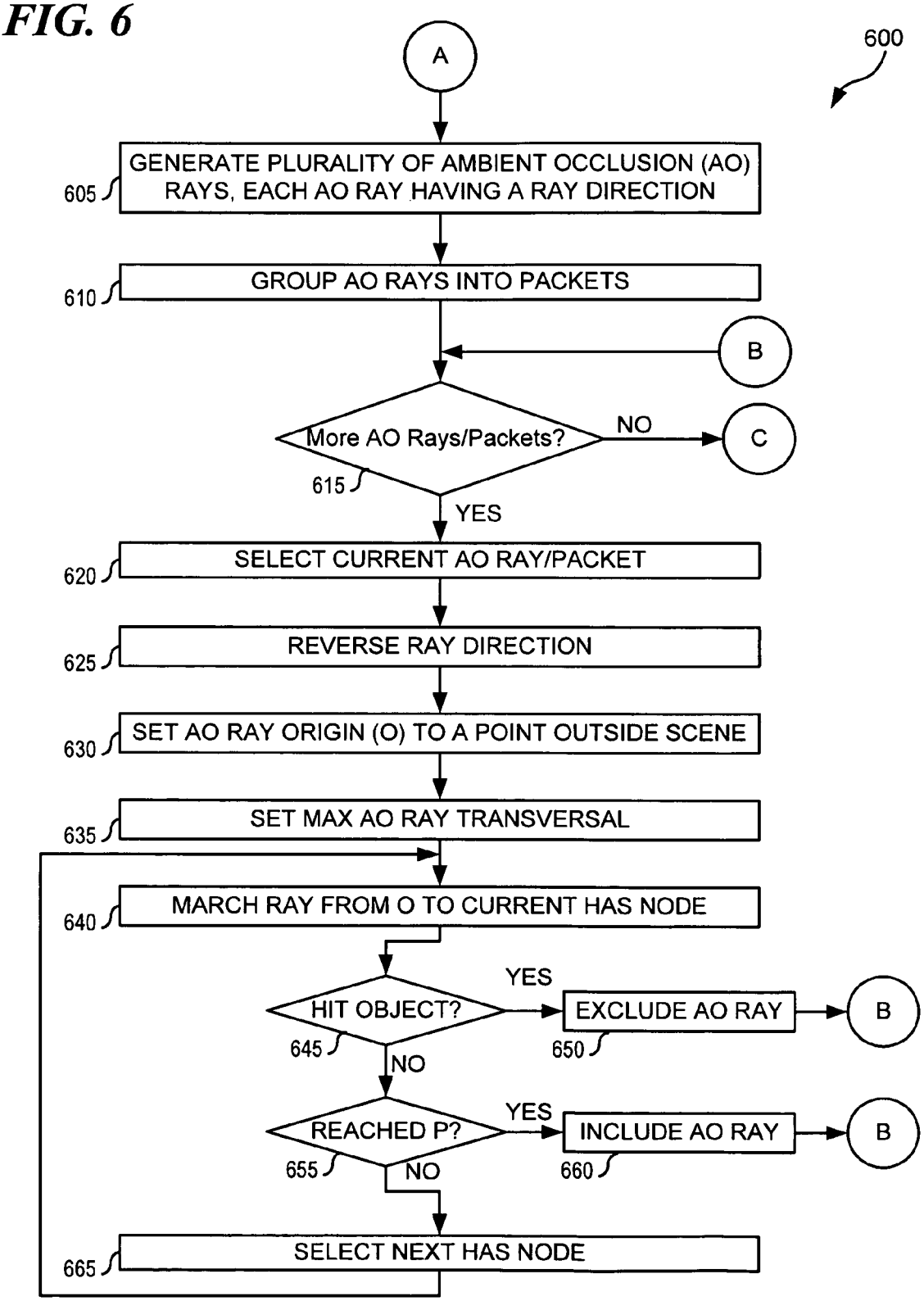
FIG. 6 illustrates a high-level flow diagram depicting logical operational steps of an improved ambient occlusion method, which can be implemented in accordance with a preferred embodiment.

FIG. 6 illustrates one embodiment of a method for photorealistic imaging using ambient occlusion. Specifically, FIG. 6 illustrates a high-level flow chart 600 that depicts logical operational steps performed by, for example, system 100 of FIG. 1, which may be implemented in accordance with a preferred embodiment. Generally, a graphics engine, such as graphics engine 102 of FIG. 1, performs the steps of the method, unless indicated otherwise.

From marker "A", the process continues to block 605. As indicated at block 605, the graphics engine generates a plurality of ambient occlusion (AO) rays based on the intersection point, P, and the surface normal, N, with each AO ray hiving a ray direction.

Next, as indicated at block 610, the graphics engine groups AO rays into packets. Next, as indicated at decisional block 615, the graphics engine determines whether there are any AO rays/packets to process. On the first run, there will be at least one AO ray to process. If at decisional block 615 there is an AO ray/packet to process, the process continues along the YES branch to block 620.

Next, as indicated at block 620, the graphics engine selects one of the at least one AO rays/packets as the current AO ray/packet. Next, as indicated at block 625, the graphics engine reverses the direction of the current AO ray (or each AO ray in the current packet). Next, as indicated at block 630, the graphics engine changes the AO ray origin from the intersection point, P, setting the origin point, O, to a point known to be outside the scene boundary, along the original direction of the current AO ray.

Next, as indicated at block 635, the graphics engine sets the maximum AO ray traversal. In one embodiment, the maximum ray traversal represents the in-scene distance between the origin point, O, and the intersection point, P. In an alternate embodiment, the maximum ray traversal represents a number of nodes between the scene boundary and the intersection point, P, in the HAS.

Next, as indicated at block 640, the graphics engine marches the current AO ray from its origin, O, to the first node of the HAS, along the direction of the AO ray. Next, as indicated at decisional block 645, the graphics engine determines whether the AO ray has hit an object in the scene. If at decisional block 645 the graphics engine determines that the AO ray has hit an object in the scene, the process continues along the YES branch to block 650. As indicated at block 650, the graphics engine excludes the AO ray and the process returns to marker "B", decisional block 615, wherein the graphics engine determines whether there are any additional AO rays/packets to process.

It at decisional block 645 the graphics engine determines that the AO ray has not hit an object in the scene (at the current node), the process continues along the NO branch to decisional block 655. As indicated at decisional block 655, the graphics engine determines whether the AO ray has reached the intersection point, P. If at decisional block 655 the AO ray has reached the intersection point, P, the process continues along the YES branch to block 660.

In one embodiment, at decisional block 655, the graphics engine also determines whether the AO ray has traveled its maximum traversal distance and, if so, counts the AO ray as having reached the intersection point, P. As indicated at block 660, the graphics engine includes the AO ray and the process returns to marker "B", decisional block 615, wherein the graphics engine determines whether there are any additional AO rays/packets to process.

If at decisional block 655 the AO ray has not reached the intersection point, P, the process continues along the NO branch to block 665. As indicated at block 665, the graphics engine selects the next HAS node as the current HAS node and the process returns to block 640, wherein the graphics engine marches the AO ray to the current HAS node.

Thus, as illustrated in blocks 640 to 665, the graphics engine marches each AO ray from its origin into the scene, toward the intersection point, P. If the AO ray hits an object on its way to the intersection point, the graphics engine excludes that AO ray and selects the next AO ray for processing. If the AO ray does not hit an object on its way to the intersection point, the graphics engine includes that AO ray and selects the next AO ray for processing.

Figure 7:
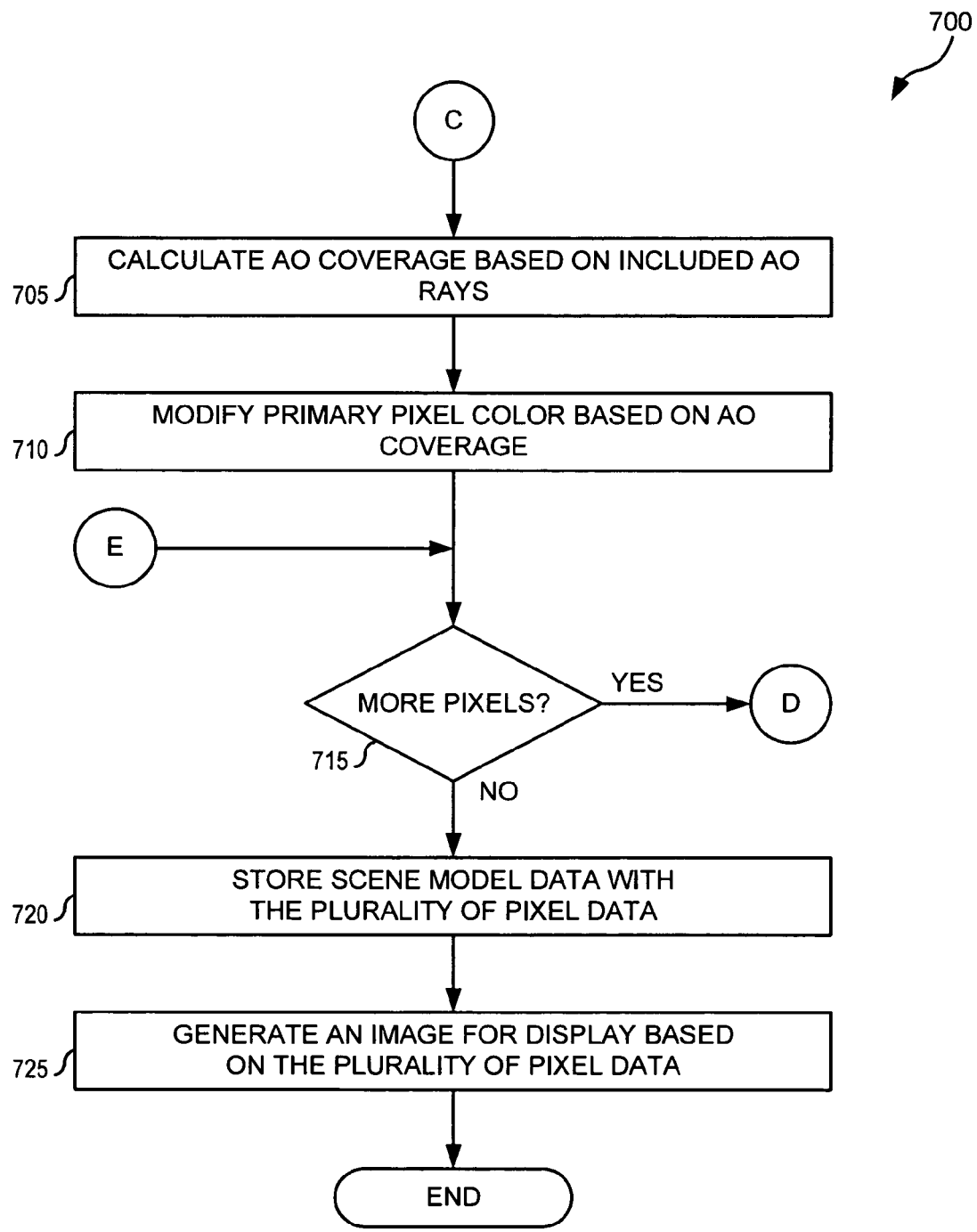
FIG. 7 illustrates a high-level flow diagram depicting logical operational steps of an improved ambient occlusion method, which can be implemented in accordance with a preferred embodiment.

If at decisional block 615 there are no more AO rays/packets (for the current primary ray intersection point), the process continues along the NO branch to marker "C" of FIG. 7.

FIG. 7 illustrates one embodiment of a method for photorealistic imaging using ambient occlusion. Specifically, FIG. 7 illustrates a high-level flow chart 700 that depicts logical operational steps performed by, for example, system 100 of FIG. 1, which may be implemented in accordance with a preferred embodiment. Generally, a graphics engine, such as graphics engine 102 of FIG. 1, performs the steps of the method, unless indicated otherwise.

From marker "C", the process continues to block 705. As indicated at block 705, the graphics engine calculates the AO coverage for the current pixel based on the included AO rays. In an alternate embodiment, the graphics engine calculates the AO coverage for the current pixel based on both the included and the excluded AO rays.

Next, as indicated at block 710, the graphics engine modifies the primary pixel color based on the calculated AO coverage. Next, as indicated at decisional block 715, the graphics engine determines whether there are additional pixels and/or pixel data to process. If at decisional block 1430 there are additional pixels to process, the process continues along the YES branch to marker "D", returning to block 510 of FIG. 5, wherein the graphics engine selects the next pixel data as the current pixel data, and the process continues as described above.

If at block 525 the primary ray does not intersect an object in the scene, the process continues along the NO branch to marker "E", wherein the process continues to decisional block 715 as described above. Next, as indicated at block 720, the graphics engine stores the scene model data with the plurality of pixel data. Next, as indicated at block 725, a display subsystem generates an image for display based on the plurality of pixel data.

Accordingly, the disclosed embodiments provide numerous advantages over other methods and systems. For example, the graphics engine described herein can provide improved ray tracing performance, even in systems with limited local storage. The disclosed embodiments also improve ambient occlusion performance that is scalable to fit the requirements of the desired photorealism quality and particular system used to embody the graphics engine.

As described above, one or more embodiments described herein may be practiced or otherwise embodied in a computer system. Generally, the term "computer," as used herein, refers to any automated computing machinery. The term "computer" therefore includes not only general purpose computers such as laptops, personal computers, minicomputers, and mainframes, but also devices such as personal digital assistants (PDAs), network enabled handheld devices, internet or network enabled mobile telephones, and other suitable devices. FIG. 15 is a block diagram providing details illustrating an exemplary computer system employable to practice one or more of the embodiments described herein.

Figure 8:
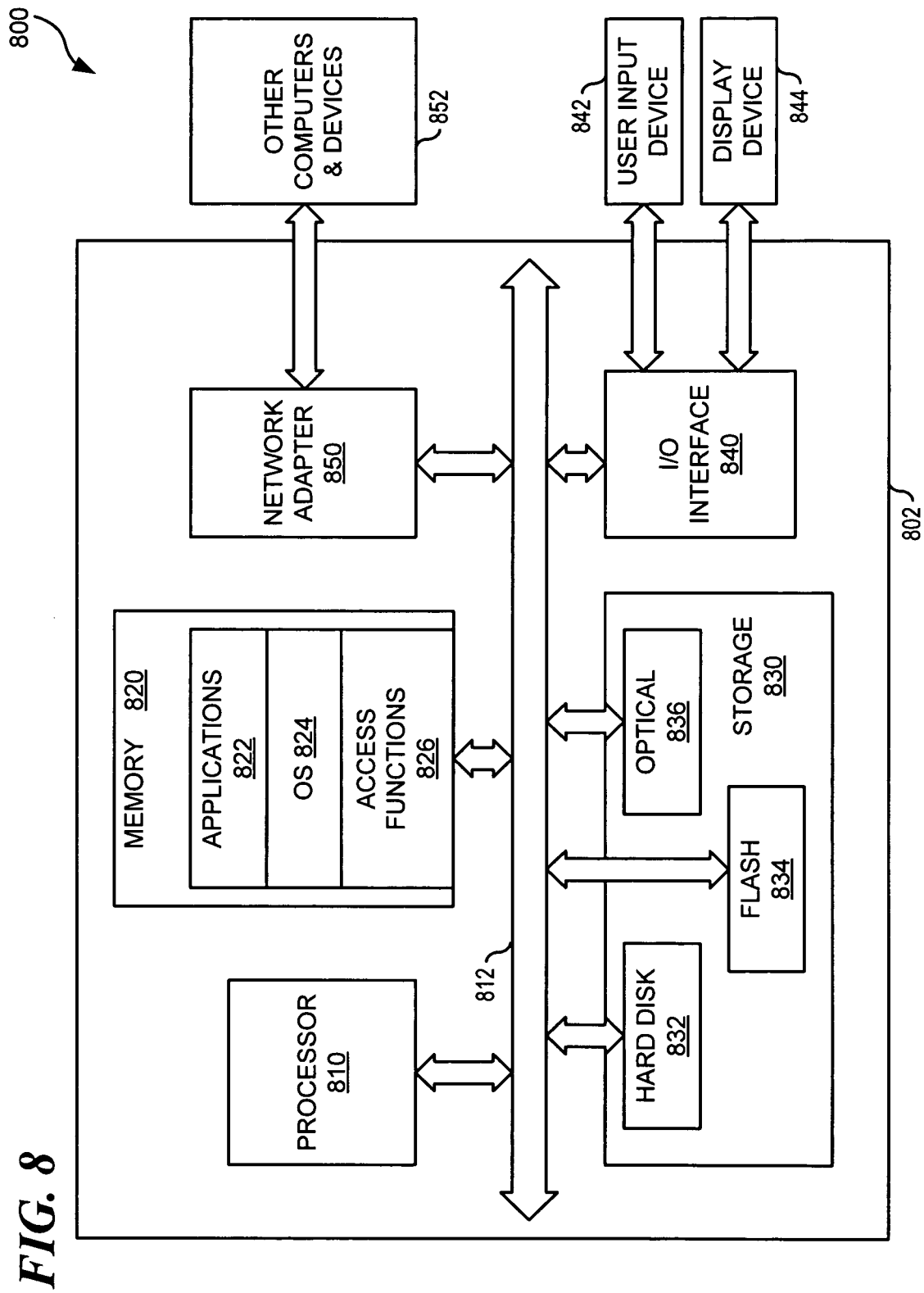
FIG. 8 illustrates a block diagram showing an exemplary computer system, which can be configured to incorporate one or more preferred embodiments.

Specifically, FIG. 8 illustrates a computer system 800. Computer system 800 includes computer 802. Computer 802 is an otherwise conventional computer and includes at least one processor 810. Processor 810 is an otherwise conventional computer processor and can comprise a single-core, dual-core, central processing unit (PU), synergistic PU, attached PU, or other suitable processors.

Processor 810 couples to system bus 812. Bus 812 is an otherwise conventional system bus. As illustrated, the various components of computer 802 couple to bus 812. For example, computer 802 also includes memory 820, which couples to processor 810 through bus 812. Memory 820 is an otherwise conventional computer main memory, and can comprise, for example, random access memory (RAM). Generally, memory 820 stores applications 822, an operating system 824, and access functions 826.

Generally, applications 822 are otherwise conventional software program applications, and can comprise any number of typical programs, as well as computer programs incorporating one or more embodiments of the present invention. Operating system 824 is an otherwise conventional operating system, and can include, for example, Unix, AIX, Linux, Microsoft Windows™, MacOS™, and other suitable operating systems. Access functions 826 are otherwise conventional access functions, including networking functions, and can be include in operating system 824.

Computer 802 also includes storage 830. Generally, storage 830 is an otherwise conventional device and/or devices for storing data. As illustrated, storage 830 can comprise a hard disk 832, flash or other volatile memory 834, and/or optical storage devices 836. One skilled in the art will understand that other storage media can also be employed.

An I/O interface 840 also couples to bus 812. I/O interface 840 is an otherwise conventional interface. As illustrated, I/O interface 840 couples to devices external to computer 802. In particular, I/O interface 840 couples to user input device 842 and display device 844. Input device 842 is an otherwise conventional input device and can include, for example, mice, keyboards, numeric keypads, touch sensitive screens, microphones, webcams, and other suitable input devices. Display device 844 is an otherwise conventional display device and can include, for example, monitors, LCD displays, GUI screens, text screens, touch sensitive screens, Braille displays, and other suitable display devices.

A network adapter 850 also couples to bus 812. Network adapter 850 is an otherwise conventional network adapter, and can comprise, for example, a wireless, Ethernet, LAN, WAN, or other suitable adapter. As illustrated, network adapter 850 can couple computer 802 to other computers and devices 852. Other computers and devices 852 are otherwise conventional computers and devices typically employed in a networking environment. One skilled in the art will understand that there are many other networking configurations suitable for computer 802 and computer system 800.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that variations of the above-disclosed and other features and functions, or alternatives thereof, may be desirably combined into many other different systems or applications. Additionally, various presently unforeseen or unanticipated alternatives, modifications, variations or improvements therein may be subsequently made by those skilled in the art, which are also intended to be encompassed by the following claims.

What is claimed is:

1. A method, comprising:
   receiving scene model data including a scene geometry model and a plurality of pixel data describing objects arranged in a scene;
   selecting a first pixel data of the plurality of pixel data;
   generating a primary pixel color based on the first pixel data, without also generating or tracing a ray;
   generating a primary ray based on the first pixel data;
   determining whether the primary ray intersects an object in the scene;
   if the primary ray intersects an object in the scene, determining an intersection point, P;
   determining a surface normal, N, based on the object intersected and the intersection point, P;
   determining a primary hit color based on the intersection point, P;
   modifying the primary pixel color based on the primary hit color;
   generating a plurality of ambient occlusion (AO) rays, based on the intersection point, P and the surface normal, N, each AO ray having a direction, D;
   for each AO ray, reversing the AO ray direction, D, and setting the AO ray origin, O, to a point outside the scene;
   setting a maximum traversal distance for each AO ray, wherein the maximum traversal distance is a distance between the origin, O, of the respective AO ray and the intersection point, P;
   marching each AO ray from the AO ray origin into the scene to the intersection point, P;
   if an AO ray intersects an object before traveling its respective maximum traversal distance, excluding that AO ray from ambient occlusion calculations;
   if an AO ray does not intersect an object before traveling its respective maximum traversal distance, including that ray in ambient occlusion calculations;
   estimating ambient occlusion based on included AO rays;
   shading the primary pixel color based on the ambient occlusion and the primary hit color; and
   generating an image based on the primary pixel color for the pixel data.

2. The method of claim 1, further comprising organizing the scene geometry model into a hierarchical acceleration structure (HAS) comprising a plurality of nodes.

3. The method of claim 2, wherein the HAS is a kd-tree.

4. The method of claim 2, wherein the HAS is a bounding volume hierarchy.

5. The method of claim 2, wherein marching each AO ray comprises traversing the HAS from node to node, and the maximum traversal distance expresses a number of nodes between a scene boundary and the intersection point, P.

6. The method of claim 1, further comprising grouping the AO rays into packets.

7. A computer program product for generating an image, the computer program product, comprising:
   a non-transitory computer useable medium having computer useable program code embodied therewith, the computer useable program code comprising:
   computer usable program code configured to receive scene model data including a scene geometry model and a plurality of pixel data describing objects arranged in a scene;
   computer usable program code configured to select a first pixel data of the plurality of pixel data;

computer usable program code configured to generate a primary pixel color based on the first pixel data, without also generating or tracing a ray;

computer usable program code configured to generate a primary ray based on the first pixel data;

computer usable program code configured to determine whether the primary ray intersects an object in the scene;

computer usable program code configured to, if the primary ray intersects an object in the scene, determine an intersection point, P;

computer usable program code configured to determine a surface normal, N, based on the object intersected and the intersection point, P;

computer usable program code configured to determine a primary hit color based on the intersection point, P;

computer usable program code configured to modify the primary pixel color based on the primary hit color;

computer usable program code configured to generate a plurality of ambient occlusion (AO) rays, based on the intersection point, P and the surface normal, N, each AO ray having a direction, D;

computer usable program code configured to, for each AO ray, reverse the AO ray direction, D, and to set the AO ray origin, O, to a point outside the scene;

computer usable program code configured to set a maximum traversal distance for each AO ray, wherein the maximum traversal distance is a distance between the origin, O, of the respective AO ray and the intersection point, P;

computer usable program code configured to march each AO ray from the AO ray origin into the scene to the intersection point, P;

computer usable program code configured to, if an AO ray intersects an object before traveling its respective maximum traversal distance, exclude that AO ray from ambient occlusion calculations;

computer usable program code configured to, if an AO ray does not intersect an object before traveling its respective maximum traversal distance, include that ray in ambient occlusion calculations;

computer usable program code configured to estimate ambient occlusion based on included AO rays;

computer usable program code configured to shade the primary pixel color based on the ambient occlusion and the primary hit color; and computer usable program code configured to generate an image based on the primary pixel color for the pixel data.

8. The computer program product of claim 7, further comprising computer usable program code configured to organize the scene geometry model into a hierarchical acceleration structure (HAS) comprising a plurality of nodes.

9. The computer program product of claim 8, wherein the HAS is a kd-tree.

10. The computer program product of claim 8, wherein the HAS is a bounding volume hierarchy.

11. The computer program product of claim 8, wherein marching each AO ray comprises traversing the HAS from node to node, and the maximum traversal distance expresses a number of nodes between a scene boundary and the intersection point, P.

12. The computer program product of claim 7, further comprising computer usable program code configured to group the AO rays into packets.

13. A system, comprising:
an image display coupled to a display subsystem;
a processor coupled to the display subsystem and configured to:
receive scene model data including a scene geometry model and a plurality of pixel data describing objects arranged in a scene;
select a first pixel data of the plurality of pixel data;
generate a primary pixel color based on the first pixel data, without also generating or tracing a ray;
generate a primary ray based on the first pixel data;
determine whether the primary ray intersects an object in the scene;
if the primary ray intersects an object in the scene, determine an intersection point, P;
determine a surface normal, N, based on the object intersected and the intersection point, P;
determine a primary hit color based on the intersection point, P;
modify the primary pixel color based on the primary hit color;
generate a plurality of ambient occlusion (AO) rays, based on the intersection point, P and the surface normal, N, each AO ray having a direction, D;
for each AO ray, reverse the AO ray direction, D, and set the AO ray origin, O, to a point outside the scene;
set a maximum traversal distance for each AO ray, wherein the maximum traversal distance is a distance between the origin, O, of the respective AO ray and the intersection point, P;
march each AO ray from the AO ray origin into the scene to the intersection point, P;
if an AO ray intersects an object before traveling its respective maximum traversal distance, exclude that AO ray from ambient occlusion calculations;
if an AO ray does not intersect an object before traveling its respective maximum traversal distance, include that ray in ambient occlusion calculations;
estimate ambient occlusion based on included AO rays;
shade the primary pixel color based on the ambient occlusion and the primary hit color; and
generate an image on the image display based on the primary pixel color for the pixel data.

14. The system of claim 13, wherein the processor is further configured to organize the scene geometry model into a hierarchical acceleration structure (HAS) comprising a plurality of nodes.

15. The system of claim 14, wherein marching each AO ray comprises traversing the HAS from node to node, and the maximum traversal distance expresses a number of nodes between a scene boundary and the intersection point, P.

* * * * *